US005259115A

United States Patent [19]

Blüder et al.

[11] Patent Number: 5,259,115

[45] Date of Patent: Nov. 9, 1993

[54] ELECTRIC HAIR CUTTING APPARATUS

[75] Inventors: Hans-Martin Blüder, Wöllstadt; Achim Flesser, Königstein, both of Fed. Rep. of Germany

[73] Assignee: Braun Aktiengesellschaft, Frankfurt, Fed. Rep. of Germany

[21] Appl. No.: 989,060

[22] Filed: Dec. 10, 1992

[30] Foreign Application Priority Data

Dec. 17, 1991 [DE] Fed. Rep. of Germany ....... 4141582

[51] Int. Cl.[5] ........................ B26B 19/28; B26B 19/02; H02K 11/00

[52] U.S. Cl. ........................................ 30/201

[58] Field of Search ......................... 30/43.1, 200, 201

[56] References Cited

U.S. PATENT DOCUMENTS 4,669,189 6/1987 Ullmann ................................ 30/201

5,084,974 2/1992 Sukow et al. ......................... 30/201

*Primary Examiner*—Douglas D. Watts

*Attorney, Agent, or Firm*—Fish & Richardson

[57] ABSTRACT

The invention is directed to an electric hair cutting apparatus in which a desired length of hair is adjustable by means of a preselector slide means (72). When the hair cutting apparatus is turned on, the drive motor (90) is operated only at the setting corresponding to the preset position. The preselector slide means (72) comprises a permanent magnet (100) having associated to it a reed contact (70) which is fixedly accommodated in the casing of the hair cutting apparatus. The use of the reed contact prevents beard hair from entering the interior of the hair cutting apparatus.

18 Claims, 5 Drawing Sheets

ELECTRIC HAIR CUTTING APPARATUS

This invention relates to an electric hair cutting apparatus, with a shearing head as well as a spacer comb which is adapted to be seated on the shearing head for sliding contact with the skin surface to be treated and is adjustable to various positions relative to the forward edge of the shearing head, as well as with a sliding switch for enabling and disabling the drive of the hair cutting apparatus, with the spacer comb and the sliding switch being provided with engageable coupling means, and with further positions being provided in addition to the "On" and "Off" positions of the sliding switch.

A hair cutting apparatus of this type is known from U.S. Pat. No. 4,669,189. To turn off the drive, the user is required to return the sliding switch to the "Off" position "0", independent of the length of the cut just made. As a result, also the spacer comb is automatically returned to the position involving the shortest cutting length, so that the user, during the next application, is unable to determine the length of the preceding hair cut.

It is therefore an object of the present invention to construct a hair cutting apparatus of the type initially referred to in a manner enabling the user to recognize a cutting length once selected as being appropriate when using the cutter in a subsequent operation.

This object is accomplished in that a magnetic preselector slide means is provided which is arranged on the spacer comb so as to be adjustable in the direction of displacement of the spacer comb, and that a reed contact associated with the preselector slide means is provided which is fixedly accommodated in the interior of the hair cutting apparatus in such fashion that the drive of the hair cutting apparatus is not energized until the sliding switch and thus the spacer comb are in a a preset position preselected on the preselector slide means.

The essential advantage in the use of the reed contact is that the reed contact is received in the interior of the hair cutting apparatus, enabling the casing of the hair cutting apparatus to be an enclosed structure. As a result, beard hair, dust, dirt or even liquids are prevented from entering the interior of the hair cutting apparatus. Further, it enables the preselector slide means to be constructed in a particularly simple manner, for example, as a permanent magnet slidably mounted in the longitudinal direction in a window provided in the spacer comb. For an improved setting of the different positions, the preselector slide means and the window are provided with matching locking means.

In a further feature, the sliding switch is movable into a further position which is opposed to the positions coupled with the spacer comb and in which the spacer comb is removable, with the drive of the hair cutting apparatus turning on in this further position, independent of the position of the preselector slide means. In this further position, the hair cutting apparatus can be operated with the spacer comb removed, independent of the position of the preselector slide means.

Further advantageous embodiments of the present invention will become apparent from the subsequent description of an embodiment of the invention, reference being had to the accompanying drawings.

The mode of function of the hair cutting apparatus will first be described without the preselector slide means provided.

Figure 1:
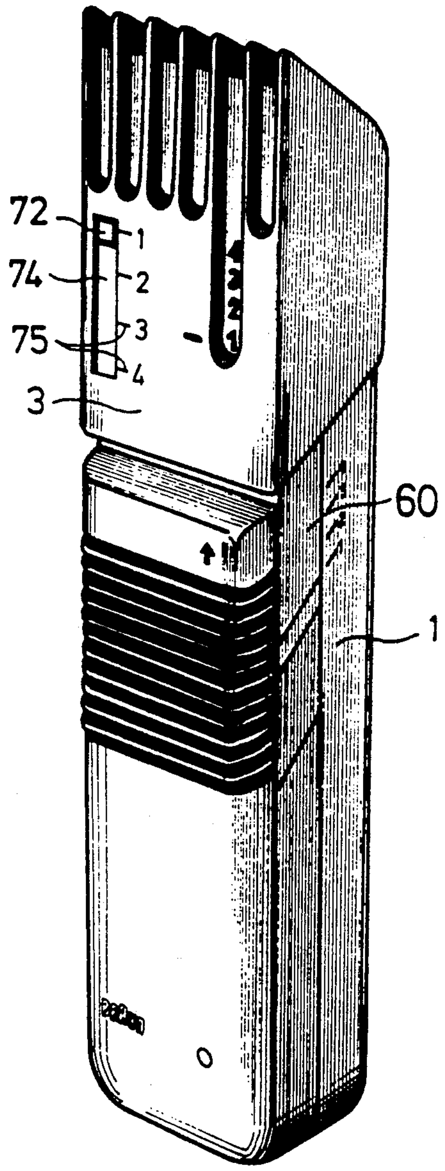
FIG. 1 is a perspective view of a hair cutting apparatus.
Figure 2:
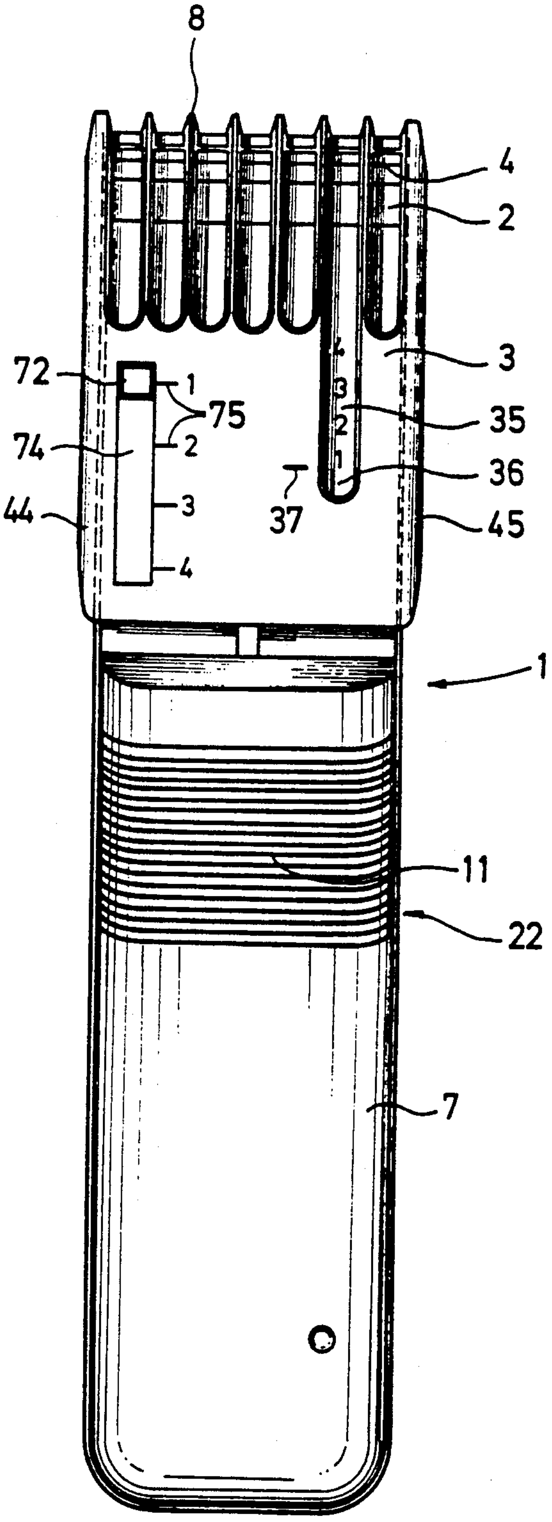
FIG. 2 is a front view of the hair cutting apparatus, showing the spacer comb in its seated position.

As becomes apparent from FIGS. 1 to 4, the hair cutting apparatus 1 comprises substantially a slim, haptical body having a shearing head 2 obstructed in FIGS. 1 and 2 by a spacer comb 3 seated on the shearing head 2. The spacer comb 3 operates to maintain a predetermined distance of the forward edge 4 of the shearing head 2 comprised of a fixed shear plate 5 and a cutting element 6 reciprocating thereon, relative to the skin surface to be treated as, for example, the scalp of a person whose hair is to be cut, with the spacer comb 3 being adjustable to different positions on the shearing head 2 relative to the body 7 of the hair cutting apparatus 1, to be explained later as the description proceeds.

The spacer comb 3, being a hollow structure, embraces the body 7 of the hair cutting apparatus 1 in the region of its shearing head 2 on all four sides, with tooth-shaped supports 8 integrally formed on the comb enabling the hair to be cut to extend therebetween up to the shearing head 2, to be eventually cut off by its cutting element 6. The remaining length of the hair after the cut corresponds to the distance between the forward edge of the tooth-shaped supports 8—when in contact with the skin surface—and the forward or cutting edge of the shearing head 2 or its associated cutting element 6, this distance being variable in the present hair cutting apparatus 1, as already mentioned.

For an efficient use of the hair cutting apparatus 1 by means of the spacer comb 3 determining the length of the hair to be cut, the spacer comb includes coupling means cooperating with appropriate coupling members of the body 7 of the hair cutting apparatus 1.

Figure 4:
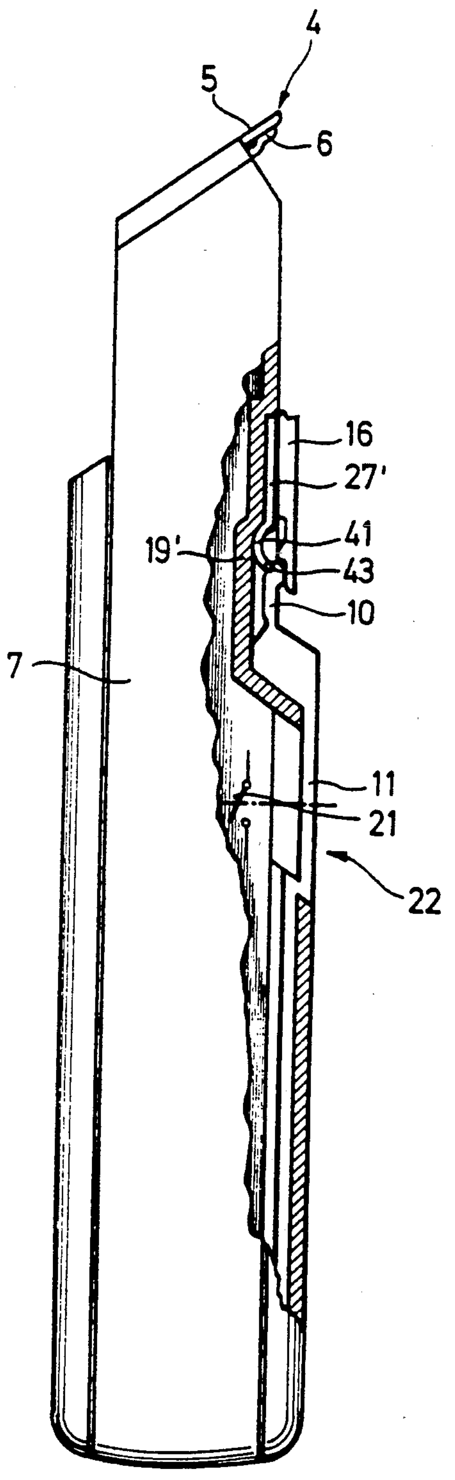
FIG. 4 is a side view of the hair cutting apparatus of FIG. 3, shown partially in longitudinal section.
Figure 5:
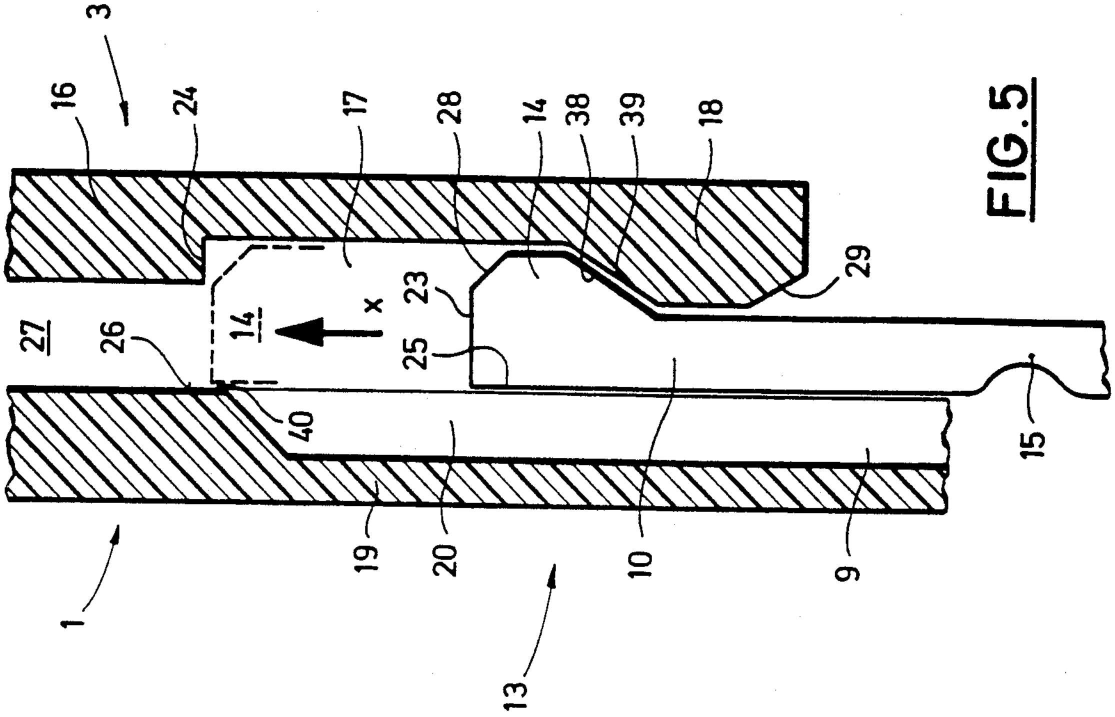
FIG. 5 is a schematic of the basic coupling structure between the hair cutting apparatus and the spacer comb seated on its shearing head.

As shown particularly in FIGS. 4 and 5, the hair cutting apparatus 1 has for this purpose a coupling rod 10 which is slidable in the direction of the longitudinal axis x of the hair cutting apparatus 1 in a guideway 9 of T-shaped cross section provided in the casing. The coupling rod 10 is operatively connected with a sliding switch 11 extending over the entire width of the hair cutting apparatus 1, thereby permitting safe operation by the user's left or right hand, that is, a one-hand operation. The sliding switch 11 fulfills several functions, first it serves to enable or disable the electrical or mechanical drive of the hair cutting apparatus 1, second it provides for engagement or disengagement of the spacer comb 3 with or from the hair cutting apparatus 1 according to the requirements of its use, and finally it operates to adjust the coupled spacer comb 3 to its individual positions of use resulting in different distances.

U.S. Pat. No. 4,669,189, reference to which is again expressly made, describes in detail the function of the coupling rod 10 slidable in longitudinal direction by means of the sliding switch 11 within and below the front wall 12 of the hair cutting apparatus 1 as it cooperates with the coupling means of the spacer comb 3.

FIG. 5 shows the basic mode of operation of the coupling 13 between the sliding switch 11 of the hair cutting apparatus 1, which sliding switch is operatively connected with the coupling rod 10, and the spacer comb 3 seatable on the shearing head 2 of the body 7 of the hair cutting apparatus 1.

As shown, the coupling rod 10 operatively connected with the sliding switch 11 includes an integrally formed coupling nose 14 which is pivotal about the axis of a film hinge 15 formed integral with the coupling rod 10, such that the coupling nose 14, following each pivot movement, automatically returns to its initial position shown in FIG. 5.

In the region of its wall 16 serving as a coupling means, the spacer comb 3 which embraces the shearing head 2 of the hair cutting apparatus 1 when seated thereon includes a coupling groove 17 receiving the coupling rod 10 together with its coupling nose 14. The coupling groove 17 comprises a detent shoulder 18 which is formed integral with the coupling wall 16 of the spacer comb 3 and is overcome by the coupling nose 14 of the coupling rod 10 withdrawing into a recess 20 formed in the region of the coupling groove 17 by a casing wall 19 of the hair cutting apparatus 1 during seating engagement of the spacer comb 3.

The seated spacer comb 3 is then retained by the coupling nose 14 of the coupling rod 10 engaging the detent shoulder 18 of the comb, being thereby secured from inadvertent disengagement from the hair cutting apparatus 1. In this seated position of the coupling members 10, 14 of the hair cutting apparatus 1 and the coupling members 17, 18 of the spacer comb 3 thus brought into relative engagement, the sliding switch 11 which also operates on an electric switch 21 for the drive is still in its "Off" position in which the supply circuit of the hair cutting apparatus 1 is open. By subsequently shifting the sliding switch 11 and consequently also the coupling rod 10 into the direction of the axis x of the hair cutting apparatus 1—which corresponds to the direction of movement x of the spacer comb 3—from the "Off" position shown in FIG. 5 to the "On" position shown in dashed lines, the sliding switch 11 will actuate the switch, thereby closing the supply circuit of the hair cutting apparatus 1 and thus enabling its drive not shown.

In this "On" position, the end wall 23 of the coupling rod 10 abuts a stop shoulder 24 integrally formed on the coupling wall 16 of the spacer comb 3, while the side wall 25 on the side remote from the coupling nose 14 (according to FIG. 5) becomes slidably engaged by the inner wall 26 of a force guide 27 formed by the casing wall 19 of the hair cutting apparatus 1 and the coupling wall 16 of the spacer comb 3. In the "On" position of the sliding switch 11, the force guide 27 thus prevents the coupling rod 10 from yielding to the stop shoulder 24. Accordingly, the beveled edge 28 of the coupling rod 10 which, as the spacer comb 3 is being seated, cooperates with the beveled edge 29 of the detent shoulder 18 of the coupling wall 16 of the comb to facilitate yielding, has no effect in this position.

Figure 6:
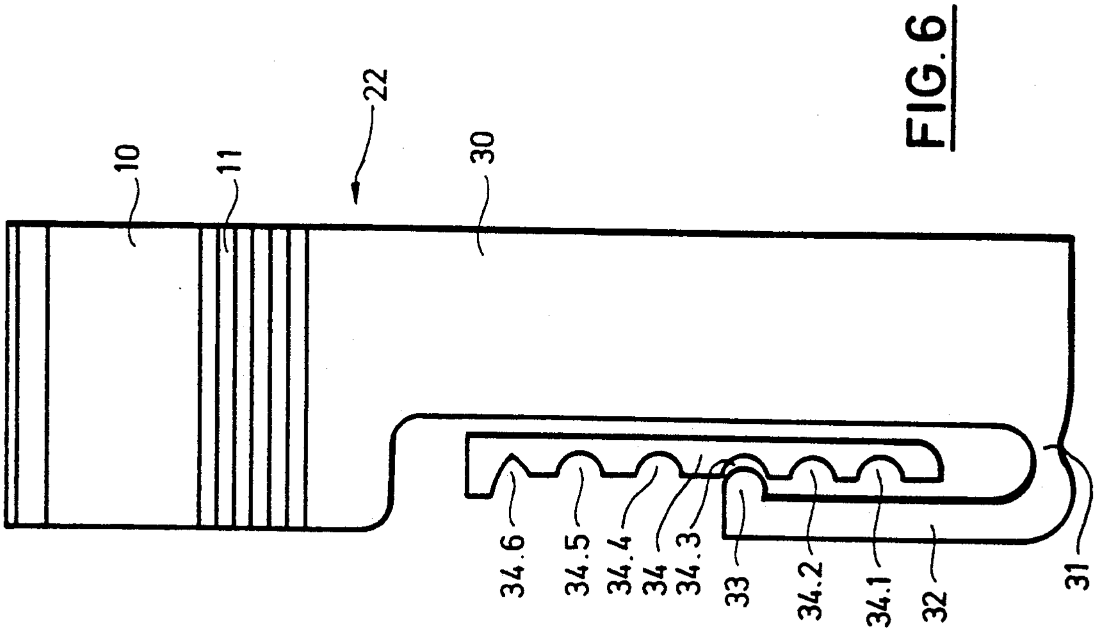
FIG. 6 is a view of the ratchet gear of the hair cutting apparatus for positioning the spacer comb at different relative distances to the forward edge of the shearing head.

FIG. 6 is a schematic front view of a vertically slidable grip member 30 comprising both the coupling rod 10 and the sliding switch 11 and serving as the central switch means of the hair cutting apparatus 1. Provided on the grip member 30 in this figure is a detent pawl 32 which is pivotal about an integrally formed film hinge 31 and has a tongue 33 which, due to its inherent resilience, engages into respective notches of a ratchet bar 34 formed fast with the casing of the hair cutting apparatus 1 to thereby provide a respective ratchet gear. The "Off" position of the sliding switch 11 is determined by engagement of the tongue 33 into the lowermost notch 34.1 (according to FIG. 6). If the sliding switch 11 is pushed upwards by one index position, the tongue 33 will engage the notch 34.2 which determines the "On" position of the sliding switch 11. The coupling rod 10, in leaving its "Off" position which it has assumed after overcoming the detent shoulder 18, will thus assume the "On" position in which its coupling nose 14 abuts the stop shoulder 24 and the inner wall 26 of the force guide 27, thereby performing the coupling engagement of the hair cutting apparatus 1 with the spacer comb 3 for the purpose of positioning the spacer comb.

Pushing the sliding switch 11 in the direction x (FIG. 5) by another index position causes the tongue 33 to fall into the notch 34.3. As a result of the abutting engagement of the coupling rod end wall 23 with the stop shoulder 24 of the coupling wall 16, the coupling rod 10 which is made to follow this movement in the direction x causes the spacer comb 3 to be shifted into a first setting. In this first setting, a relatively short length of the hair extending through the spacer comb 3 is cut. In this embodiment, the different settings are indicated by a graduated scale 35 provided on the shearing head 2 of the hair cutting apparatus 1 and showing the digits "1" to "4" in a window 36 arranged between and below two juxtaposed tooth-shaped supports 8 of the spacer comb 3. A mark 37 provided on the front of the spacer comb 3 indicates the respective setting of the spacer comb 3—in the FIG. shown, the minimum possible setting "1".

Similarly, a further upward shifting motion of the coupling rod 10 by means of the sliding switch 11 with which it is operatively connected moves the spacer comb 3 into further settings increasing the distance between the shearing head 2 and the spacer comb 3, these settings being identified by the tongue 33 falling into respective notches 34.4, 34.5 and 34.6 and being indicated on the graduated scale 35 by the mark 37 corresponding with respective scale digits "1", "2", "3" or "4", or by reading the lowermost scale digit not obstructed by the spacer comb 3, when viewed in the shifting direction.

Retracting the spacer comb 3—for example, to adjust the hair cutting apparatus 1 to a shorter length of the cut—is accomplished simply by pushing the sliding switch 11 back in opposition to the direction of the arrow x. This involves movement of the coupling rod 10 in the same direction, and the action of the force guide 27 will cause the coupling wall 16 of the spacer comb 3 to be entrained as a result of the abutting engagement of the beveled edge 38 of the rod with the corresponding beveled edge 39 of the coupling wall 16, until the setting "1" is reached in which the length of the cut is at a minimum and which is identified by the tongue 33 falling into the notch 34.3. As the coupling rod 10 continues to be pushed back in opposition to the direction of the arrow x by means of the sliding switch 11, the coupling nose 14 of the coupling rod 10, after having overcome the stop edge 40 which in FIG. 5 extends slightly below the plane of the stop shoulder 24 formed by the coupling wall 16, thus protruding relative to the latter by a small amount in the coupling direction x, reaches the area of the coupling groove 17 in which the coupling nose 14 of the coupling rod 10, abutting the detent shoulder 18 of the comb, is allowed to withdraw into the recess 20.

Accordingly, on further backward movement of the coupling rod 10 by means of the sliding switch 11, the coupling nose 14 will overcome the detent shoulder 18 by the coupling rod 10 pivoting counterclockwise about the film hinge 15, thereby releasing the spacer comb 3 for removal by hand. The sliding switch 11 of the hair cutting apparatus 1 thereby assumes the "On" position identified by the engagement of the tongue 33 into the notch 34.2, in which position the hair cutting apparatus 1 is still on. Shifting the sliding switch 11 back still further until its detent pawl 32 drops into the notch 34.1 finally turns off the entire drive of the hair cutting apparatus 1 by means of the electric switch 21 controlled or actuated by the sliding switch 11.

The mode of function of the preselector slide means provided shall now be described.

As becomes apparent from FIGS. 1 and 2, a window 74 extending in longitudinal direction of the hair cutting apparatus 1 is provided in the spacer comb 3, the window being of a distinctly elongate, rectangular structure in top plan view. In this window 74, a preselector slide means 72 is arranged which is slidable in the direction of the window 74 and thus in the longitudinal direction of the hair cutting apparatus 1. Further, marks 75 are indicated on the spacer comb 3 to identify the various "presetting positions 1 to 4" of the preselector slide means 72 in the window 74 of the spacer comb 3. "Presetting position 1" involves a what is referred to as short-hair position in which the relative distance of the spacer comb 3 to the shearing head 2 of the hair cutting apparatus 1 is at a minimum. With the spacer comb 3 seated down in place, this "presetting position 1" is at the end of the window 74 proximate to the shearing head 2. "Presetting position 4" which is arranged at the opposite end of the window 74 is a what is referred to as long-hair position in which the relative distance of the spacer comb 3 to the shearing head 2 of the hair cutting apparatus 1 is at a maximum.

The preselector slide means 72 is adjustable to any one of the "presetting positions 1 to 4" identified. For locking engagement of the preselector slide means 72 into any one of these "presetting positions 1 to 4", means are provided which shall be explained in the following with reference to FIG. 8.

Figure 8:
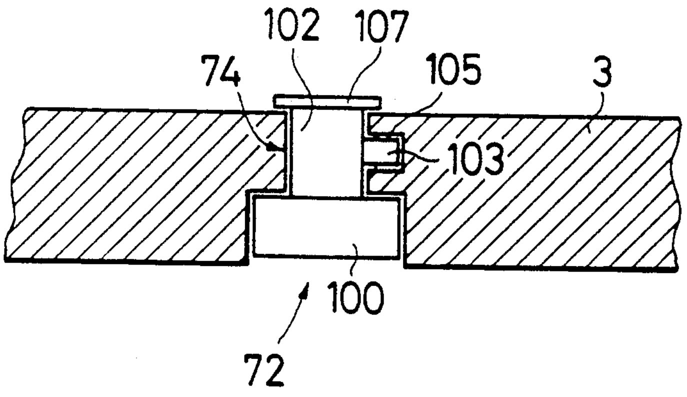
FIG. 8 is a sectional view of the hair cutting apparatus in the area of the preselector slide means.

FIG. 8 is a cross section of the spacer comb 3 in the area of the window 74, as viewed from a direction transversely to this window 74. According to FIG. 8, the window 74 is comprised of two interengaging grooves of different widths. In the area of the groove having the reduced width, the window 74 further includes a cross groove extending into the spacer comb 3. The preselector slide means 72 is comprised of a permanent magnet 100 connected with a sliding plate 107 through a connector pin 102. Projecting from the connector pin 102 is a locking tooth 103 capable of rebounding transversely to the extent of the connector pin 102. This locking tooth 103 protrudes into the above-mentioned cross groove of the window 74 in which notches 105 are provided at locations corresponding to the marks 75. At these locations, the preselector slide means 72 engages with its resilient locking tooth 103 into the associated notch 105, thereby establishing a locking engagement between the preselector slide means 72 and the window 74.

Figure 3:
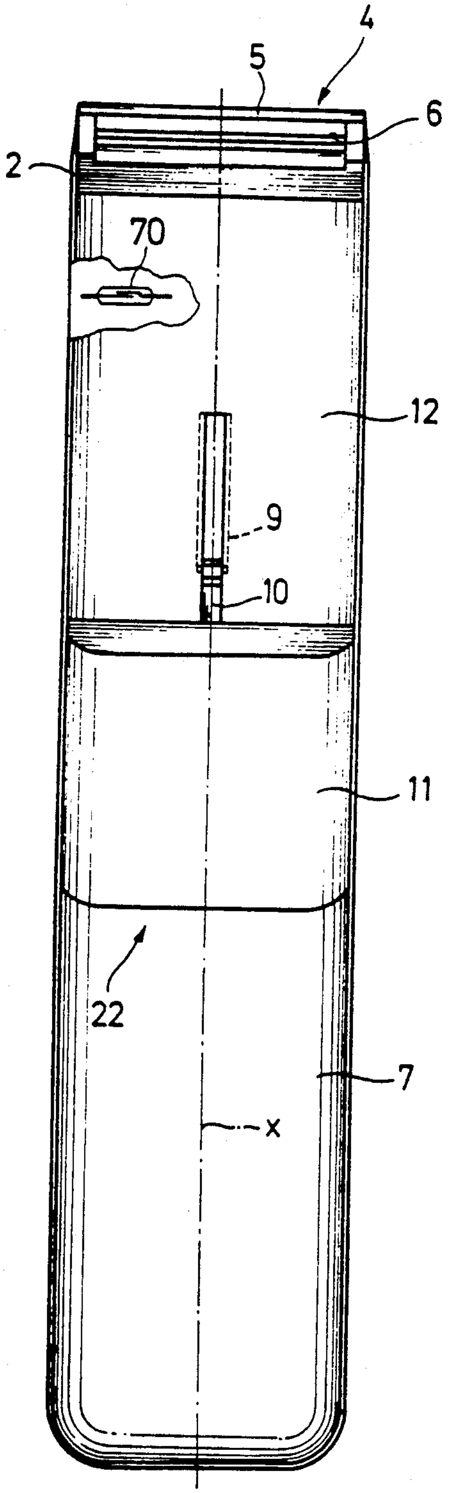
FIG. 3 is also a front view of the hair cutting apparatus, with the spacer comb removed.

As becomes apparent from FIG. 3, a reed contact 70 is provided in the interior of the casing of the hair cutting apparatus 1. This reed contact 70 is fixedly accommodated in the interior of the hair cutting apparatus 1 at a location associated with the preselector slide means 72 in such fashion that displacement of the spacer comb 3 and thus also of the preselector slide means 72 causes the latter to be disposed in the region above the reed contact 70 at some point of time. This will be explained in more detail in the following with reference to FIG. 7. However, it should be noted first that the reed contact 70, while it may be disposed transversely to the longitudinal direction of the hair cutting apparatus as illustrated in FIG. 3, may also be mounted in the longitudinal direction in the interior of the hair cutting apparatus 1.

Figure 7:
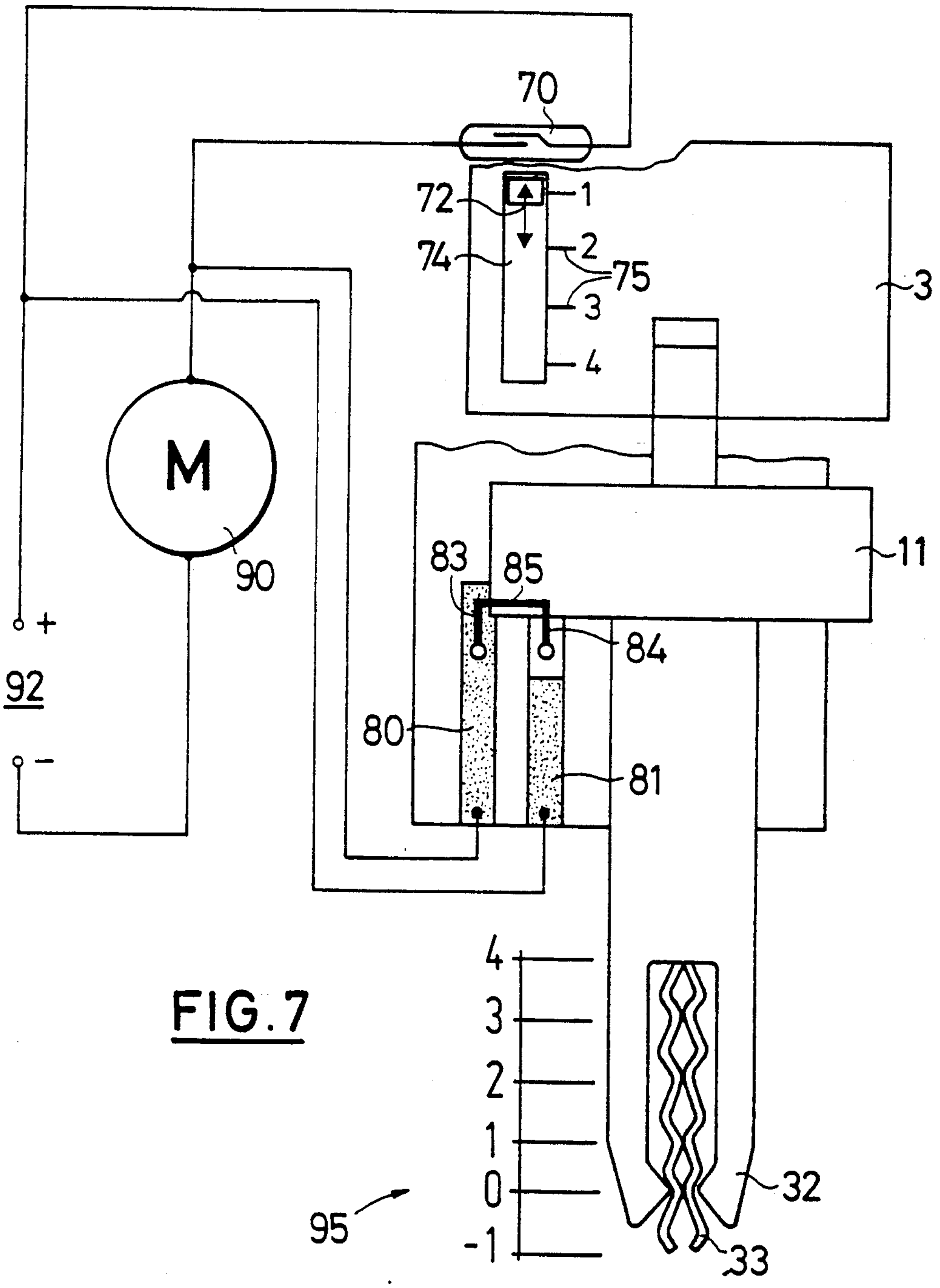
FIG. 7 is a schematic of the hair cutting apparatus incorporating a preselector slide means.

As becomes apparent from FIG. 7, the preselector slide means 72 is slidably arranged in the longitudinal direction in the window 74. The window 74 itself is provided in the spacer comb 3 which is in turn displaceable in longitudinal direction. As has already been explained, the spacer comb 3 is coupled to the sliding switch 11 by coupling means not further identified. This sliding switch 11 is in turn connected with detent pawls 32 engaging in fixedly mounted tongues 33 owing to their inherent resilience. In this manner, positions 95 are determined referred to as "settings 4, 3, 2, 1, 0 and −1" in FIG. 7. "Setting 4" is the long-hair position already mentioned, while "setting 1" is the short-hair position equally mentioned in the above. At "setting 0", the hair cutting apparatus 1 is de-energized. "Setting −1" will be explained in greater detail as the description proceeds.

As already explained in the foregoing, the preselector slide means 72 is adjustable to a respective one of the "presetting positions 1 to 4" corresponding to the "settings 1 to 4". The "presetting positions 1 to 4" are intended to ensure that the hair cutting machine is turned on only at the setting corresponding to the preset position. Accordingly, with the preselector slide means 72 set at "presetting position 1" as shown in FIG. 7, the hair cutting apparatus 1 shall be turned on only if the sliding switch 11 is at "setting 1". At all other settings, the hair cutting apparatus 1 shall remain in turned-off condition.

This is accomplished in that at "setting 0" shown in FIG. 7, the reed contact 70 is still disposed in offset relation to the preselector slide means 72 which is in "presetting position 1". If the sliding switch 11 is pushed in the longitudinal direction from "setting 0" to "setting 1", the spacer comb 3 and eventually also the preselector slide means 72 are caused to follow it in movement by the coupling means. The length of travel by which the preselector slide means 72 is moved by displacement of the sliding switch 11 from "setting 0" to "setting 1" corresponds precisely to the length of travel of the preselector slide means 72 as it moves from the "presetting position 1" into a position lying exactly over the reed contact 70. The permanent magnet 100 of the preselector slide means 72 then causes closing of the reed contact 70, which in turn results in closing of the circuit via the source of power 92 and the motor 90, consequently energizing the drive of the hair cutting apparatus 1. Pushing the sliding switch 11 further, for example, up to "setting 2", also involves further displacement of the preselector slide means 72 into a position away from the reed contact 70. The permanent magnet 100 of the preselector slide means 72 thus ceases to operate on the reed contact 70, causing it to open and thus open the circuit for the motor 90.

As a further example, with the preselector slide means 72 in "presetting position 3", it is necessary for the sliding switch 11 to be shifted up to "setting 3" to enable the permanent magnet 100 of the preselector slide means 72 to be positioned above the reed contact 70, thus activating the drive for the hair cutting apparatus 1. In all other positions of the sliding switch 11, the permanent magnet 100 of the preselector slide means 72 is not above the reed contact 70, thus preventing the circuit for the motor 90 from being closed.

Removal of the spacer comb also involves removal of the preselector slide means 72. As a result of the open non-operative position of the reed contact 70, this would mean that the hair cutting apparatus could not be turned on with the spacer comb removed. To avoid this, a further "setting −1" is provided in which the hair cutting apparatus can be turned on with the spacer comb removed. To prevent "setting −1" from being reached with the spacer comb 3 seated in place, the coupling rod 10 (FIG. 5) is configured such that the sliding switch 11 can be pushed into "setting −1" only when the spacer comb is unseated. Otherwise, it could happen that at "setting −1" the user cuts the hair to a shorter length than provided by the position of the preselector slide means 72.

As becomes apparent from FIG. 7, the above-identified further "setting −1" can be obtained by shifting the sliding switch 11 into a direction which is opposed to the direction of "settings 1 to 4". As becomes equally apparent from FIG. 7, the sliding switch 11 is operatively associated with two conductors 80, 81 mounted on a casing portion of the hair cutting apparatus 1 not identified in more detail in the displacement direction of the sliding switch 11 and thus in the longitudinal direction of the hair cutting apparatus 1. The two conductors 80, 81 are interconnected by means of an electrical connection 85 using sliding contacts 83, 84. Conductor 80 is electrically conductive over its entire length. By contrast, conductor 81 is electrically conductive only over the "dotted" length shown in FIG. 7. As a result, the sliding contact 84 is in the non-conductive region of the conductor 81 when the sliding switch 11 assumes "setting 0". In this event, electrical contact is not established between conductor 80 and conductor 81. However, if the sliding switch 11 is moved to "setting −1−", the sliding contact 84 will move into the electrically conductive region of conductor 81. This produces, through the electrical connection 85, a short circuit between conductor 80 and conductor 81, causing the circuit to be closed via the source of power 92 and the motor 90. Accordingly, in this position the drive of the hair cutting apparatus 1 is activated via the conductors 80, 81 and the electrical connection 85.

We claim:

1. An electric hair cutting apparatus comprising a drive, a shearing head coupled to said drive, a spacer comb adapted to be seated on said shearing head for sliding contact with the skin surface to be treated and adjustable to various positions relative to the forward edge of said shearing head, a sliding switch for enabling and disabling said drive, said spacer comb and said sliding switch being provided with engageable coupling means, and with further positions being provided in addition to the "On" and "Off" positions of the sliding switch, magnetic preselector slide structure on said spacer comb for adjustment in the direction of displacement of said spacer comb, and contact structure connected in circuit with said drive and associated with said preselector slide structure and fixedly accommodated in the interior of said hair cutting apparatus in such fashion that said drive of the hair cutting apparatus is not energized until said sliding switch and thus said spacer comb are in a position preselected on said preselector slide structure.

2. The electric cutting apparatus of claim 1 wherein in a short hair presetting position, said preselector slide structure is arranged at the end of its displacement travel proximate to said shearing head while in a long-hair presetting position said preselector slide structure is at the end of its displacement travel remote from said shearing head.

3. The electric hair cutting apparatus of claim 2 wherein said spacer comb includes window structure extending in longitudinal direction for displacement of said preselector slide structure, and locking structure for locking engagement of said preselector slide structure in said window structure.

4. The electric hair cutting apparatus of claim 3 wherein said locking structure conforms to said window structure.

5. The electric hair cutting apparatus of claim 4 wherein said preselector slide structure includes a permanent magnet.

6. The electric hair cutting apparatus of claim 5 wherein said sliding switch is moveable into a further setting which is opposed to the settings coupled with said spacer comb and in which said spacer comb is removable from said shearing head, and that at said further setting said drive of the hair cutting apparatus is turned on, independent of the position of said preselector slide structure.

7. The electric hair cutting apparatus of claim 6 wherein said sliding switch is provided with an electrical connection interconnecting at said further setting two otherwise separate conductors.

8. The electric hair cutting apparatus of claim 1 wherein said spacer comb includes window structure extending in longitudinal direction for displacement of said preselector slide structure, and locking structure for locking engagement of said preselector slide structure in said window structure.

9. The electric hair cutting apparatus of claim 8 wherein said locking structure conforms to said window structure.

10. The electric hair cutting apparatus of claim 1 wherein said preselector slide structure includes a permanent magnet.

11. The electric hair cutting apparatus of claim 10 wherein said sliding switch is moveable into a further setting which is opposed to the settings coupled with said spacer comb and in which said spacer comb is removable from said shearing head, and that at said further setting said drive of the hair cutting apparatus is turned on, independent of the position of said preselector slide structure.

12. The electric hair cutting apparatus of claim 4 wherein said sliding switch is provided with an electrical connection interconnecting at said further setting two otherwise separate conductors.

13. The electric hair cutting apparatus of claim 1 wherein said sliding switch is moveable into a further setting which is opposed to the settings coupled with said spacer comb and in which said spacer comb is removable from said shearing head, and that at said further setting said drive of the hair cutting apparatus is turned on, independent of the position of said preselector slide structure.

14. The electric hair cutting apparatus of claim 13 wherein said sliding switch is provided with an electrical connection interconnecting at said further setting two otherwise separate conductors.

15. The electric cutting apparatus of claim 14 wherein in a short hair presetting position, said preselector slide structure is arranged at the end of its displacement travel proximate to said shearing head while in a long-hair presetting position said preselector slide structure is at the end of its displacement travel remote from said shearing head.

16. The electric hair cutting apparatus of claim 15 wherein said preselector slide structure includes a permanent magnet.

17. The electric hair cutting apparatus of claim 16 wherein said spacer comb includes window structure extending in longitudinal direction for displacement of said preselector slide structure, and locking structure for locking engagement of said preselector slide structure in said window structure.

18. The electric hair cutting apparatus of claim 17 wherein said locking structure conforms to said window structure.

* * * * *

UNITED STATES PATENT AND TRADEMARK OFFICE

CERTIFICATE OF CORRECTION

PATENT NO. : 5,259,115
DATED : November 9, 1993
INVENTOR(S) : Hans-Martin Bluder, et. al.

It is certified that error appears in the above-indentified patent and that said Letters Patent is hereby corrected as shown below:

Col. 7, line 54, "-1-" should be -- -1 --.

Col. 8, claim 12, line 67, "4" should be --11--.

Signed and Sealed this

Twenty-second Day of February, 1994

Attest:

BRUCE LEHMAN

*Attesting Officer* *Commissioner of Patents and Trademarks*